United States Patent [19]
Bridwell et al.

[11] 3,747,276
[45] July 24, 1973

[54] METHOD AND APPARATUS FOR CONTOURING AND SHARPENING CIRCULAR SAWS

[75] Inventors: Harold C. Bridwell, Salt Lake City; Norman R. Souders, Bountiful, both of Utah

[73] Assignee: Christensen Diamond Products Company, Salt Lake City, Utah

[22] Filed: May 7, 1971

[21] Appl. No.: 141,138

[52] U.S. Cl............................... 51/3, 51/246, 51/292
[51] Int. Cl............................................... B24b 5/00
[58] Field of Search....................... 51/3, 15, 262 T, 51/262 A, 262 R, 5, 263, 292, 247, 246, 285; 125/11 R; 76/37, 45, 25 A, 85, 48, 112

[56] References Cited
UNITED STATES PATENTS

| | | | |
|---|---|---|---|
| 2,879,633 | 3/1959 | Gage.................................... | 51/247 |
| 3,147,572 | 9/1964 | Kempe................................. | 51/15 |
| 3,026,747 | 3/1962 | Johnson.............................. | 76/112 |
| 2,716,908 | 9/1955 | Lundberg............................ | 51/247 |
| 2,207,433 | 7/1940 | Haswell............................... | 51/247 |

Primary Examiner—Charles W. Lanham
Assistant Examiner—M. J. Keenan
Attorney—Bernard Kriegel and Kendrick, Subkow & Kriegel

[57] ABSTRACT

Circular saws, particularly diamond circular saws, have their rim portions contoured and sharpened during their performance of cutting operations in the work by impinging cutting or abrading materials, at timed or required intervals, against the cutting surfaces of the saw to remove some matrix material in which the diamonds, or the like, are embedded, thereby exposing them for effective and efficient cutting of the work.

14 Claims, 3 Drawing Figures

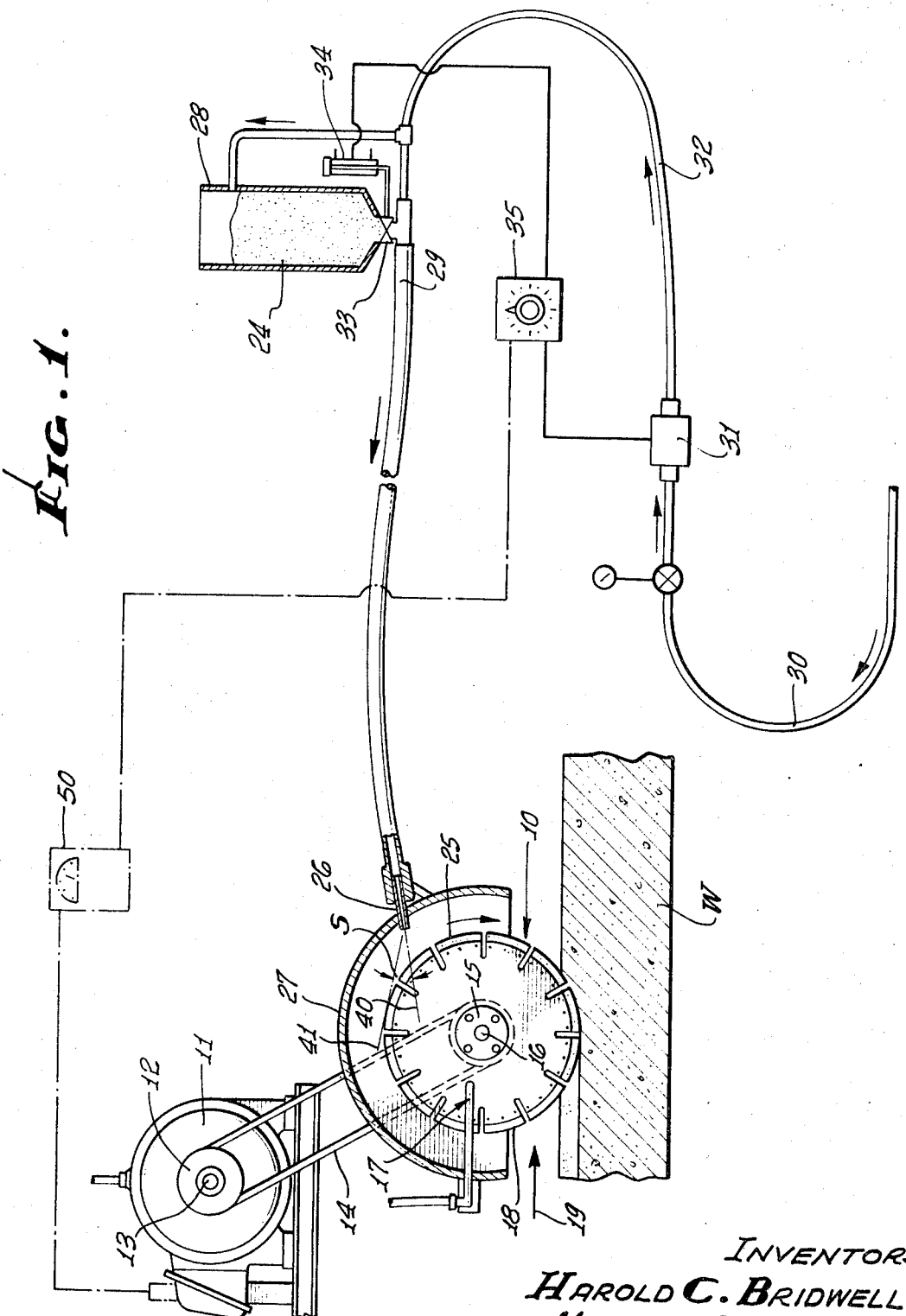

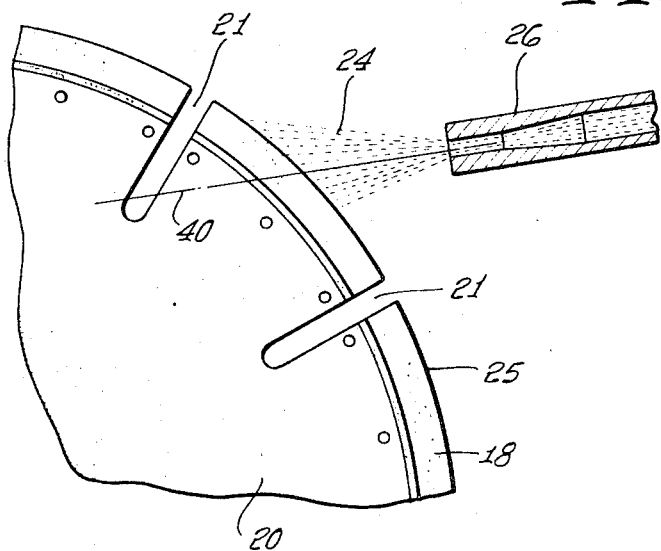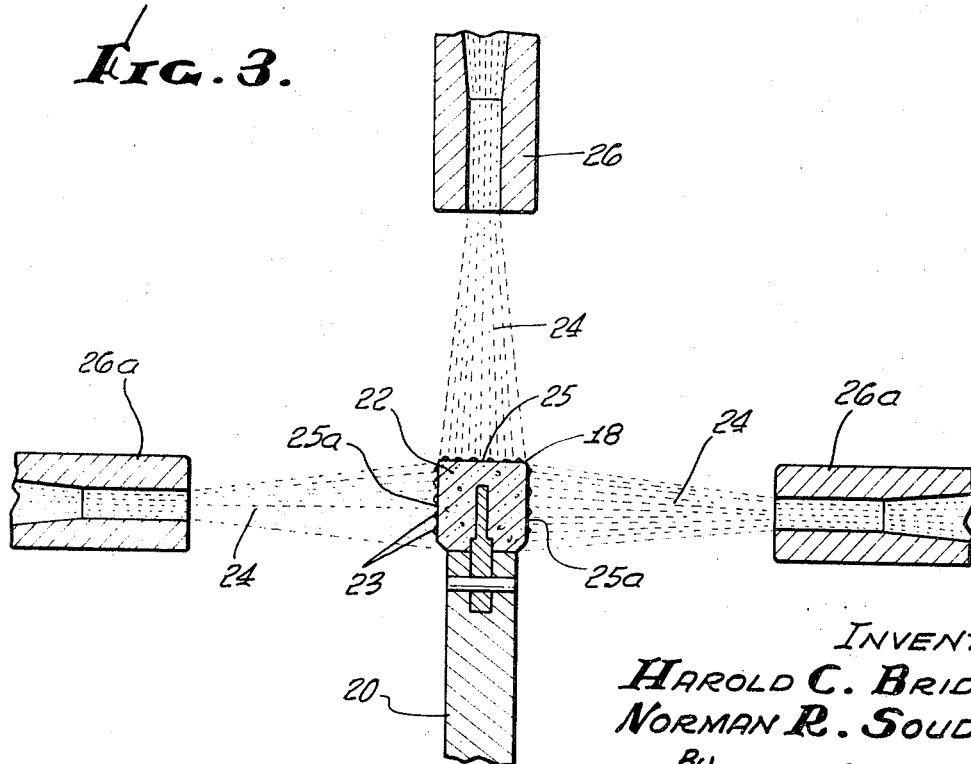

METHOD AND APPARATUS FOR CONTOURING AND SHARPENING CIRCULAR SAWS

The present invention relates to contouring and sharpening of circular saws, and more particularly to diamond circular saws in which the rim portions comprise matrix material with diamond cutting elements embedded therein.

Circular saw blades, including diamond circular saw blades, are used for sawing stone, refractories, concrete, etc. without provision for retaining sharpness of the saw blade during its life cycle. Diamond saws are usually sharp when new. They retain only the degree of sharpness during their life cycle that is caused by the abrasion of the matrix holding the diamonds as the matrix is contacted by the cuttings from the material being cut. This mode of retaining blade sharpness is not acceptable because many materials are hard and non-abrasive, preventing the blade from being properly sharpened by the cuttings from the material in which the saw blade is operating. For sawing hard non-abrasive rock, the matrix is usually made of a combination of materials that are soft and easily abraded. Such matrix material improves the operation of the saw blade and the materials being cut, but for many reasons is far from satisfactory.

By virtue of the present invention, contouring and sharpening of the saw blades occur during its entire life cycle to optimize its free cutting performance. More specifically, the contouring and sharpening function is accomplished while the blade is performing its cutting action in the work, thereby requiring no down time or slowing down of the cutting operation of the saw. The contouring and sharpening increases the sawing rate by increasing the efficiency of the system. The sharp blade also runs clean and cool, thereby improving the life of the saw. Since the saw is maintained in a sharp and properly contoured condition, it runs clean and cool and, therefore, has less tendency to off saw or cause spalls or fins in the rock, or other work, being cut, cutting a much smoother surface than a dull saw. Through use of the present invention, a continuously sharp saw is provided, thereby producing economic savings, by enabling material to be cut with lower horsepower equipment, lighter weight machines, smaller fixtures, and the like.

In its general aspect, the invention contemplates the sharpening of a circular saw at intervals while the saw is performing its cutting operation in the rock, or other work. A suitable material is caused to impinge upon the matrix comprising the rim of the saw to abrade away a portion of such matrix, and thereby expose diamonds embedded therein for effecting a cutting action on the work. The abrading material can be directed against the periphery of the saw blade rim, against the sides of the rim, or simultaneously against both the periphery and the sides, to expose additional diamond cutting elements as required, so that the saw blade is always in a sharp condition for most effective operation upon the work. So long as the saw is in a sharp condition, the abrading operation is not performed. After the saw has become dull to a predetermined degree, the abrading material is caused to impinge upon the matrix material, such impinging only being required for a relatively short interval when compared to the operation of the saw between sharpening periods. By way of example, the saw may be operated for 15 to 30 minutes without sharpening, followed by a sharpening period of about 10 seconds. In other words, the sharpening periods are intermittent and are each of relatively short duration.

The sharpening can be effected at predetermined timed intervals under the control of a person operating the equipment, under the control of a timer mechanism, or in response to the power output of a prime mover rotating the saw blade. As the saw blade dulls, greater power is required to maintain its rotation at the proper speed while performing the cutting action in the work. When the power requirement reaches a predetermined value, the saw is automatically resharpened.

This invention possesses many other advantages, and has other purposes which may be made more clearly apparent from a consideration of several forms and methods embodying the invention. These forms and methods are shown and described in the present specification and in the drawings accompanying and constituting a part thereof. They will now be described in detail, for the purpose of illustrating the general principles of the invention; but it is to be understood that such detailed description is not to be taken in a limiting sense.

Referring to the drawings:

FIG. 1 is a diagrammatic view of an apparatus for resharpening a saw blade while it is cutting the work;

FIG. 2 is an enlarged fragmentary view of a nozzle projecting a sharpening material against the periphery of the saw blade; and FIG. 3 is a diagrammatic view of another arrangement of plurality of nozzles projecting a sharpening material against the periphery and sides of a saw blade rim.

As illustrated in the drawings, a circular saw 10 is being rotated by a suitable prime mover 11, such as an electric motor, which rotates the saw through the agency of a driving pulley 12 secured to the motor shaft 13, and which drives a belt 14 that passes around a driven pulley 15 secured to a driven shaft or arbor 16 to which the circular saw is secured. Jets of cooling and cleaning fluid are discharged through nozzles 17 against the saw for the purpose of maintaining it in a cool and clean condition, these jets impinging upon the rim portion 18 of the saw.

The entire saw mechanism is movable relatively along the work W, so that the saw effects its cutting action therein, the direction of relative movement being indicated by the arrow 19.

A diamond circular saw is employed. Typical saw blades are illustrated in U.S. Pat. Nos. 3,162,187 and Re. 25,434. As disclosed in such patents, a disc 20, which may be made of steel, has a plurality of radial slots 21 therein, the rim portion of the disc comprising diamond impregnated cutting segments 18 suitably brazed or otherwise secured to the steel disc, the overall width of the cutting segments being slightly greater than the thickness of the disc. Such segments comprise matrix material 22 in which the diamond cutting elements 23 of a suitable mesh are impregnated. The matrix may include tungsten carbide particles, tungsten powder, and the like, and a suitable binder material.

As disclosed in FIG. 1, the blade 10 is contoured and sharpened by the jetting and impacting of an abrasive powder 24 in a fluid stream against the periphery 25 of the blade from a nozzle 26 located outwardly of but adjacent to the blade periphery, this nozzle being suitably supported, as from a water guard 27, that partially surrounds the saw blade. The abrasive powder is contained in a suitable tank 28, feeding from its lower end into a suitable conduit 29 that extends to and is connected with the nozzle. A fluid medium, such as compressed air from a suitable source, passes through a line 30 and through an air valve 31 into another line 32 connected to the abrasive powder conduit 29. A discharge valve 33 is located at the lower end of the tank 28, its opening and closing being controlled by a suitable solenoid 34 electrically connected to a timer 35, which is also electrically connected to an electric power source (not shown) and to the air valve 31, which may also be of the solenoid operated type.

The timer 35 is set to close the circuit to the solenoid air valve 31 and abrasive powder valve 33 at predetermined intervals, such valves being opened for a predetermined period so that the abrasive powder is discharged from the nozzle 26 and impacted against the periphery 25 of the rotating saw blade, while it is performing its cutting action in the rock W, or other work. The impacting action occurs for a sufficient period to abrade away some of the matrix material 22 and expose diamond particles 23, thereby effecting a sharpening of the blade periphery. When the sharpening interval is over, the timer 35 will open the circuit to both the air valve 31 and the abrasive powder valve 33, effecting their closing. The saw will continue its cutting operation. When it has reached a predetermined state of non-sharpness or dullness, the timer 35 will again effect opening of the valves 31, 33 so that a resharpening action can again occur. By way of example, a sharpening period may last about 10 seconds, and the interval between sharpening periods will extend from about 15 to 30 minutes. Both the sharpening period and the interval between sharpening periods are determined by the particular work being cut, the material 24 discharged from the nozzle 26 for effecting the abrading action on the saw rim 25, the depth of cut, and the like.

The axis 40 of the discharge nozzle 26 is set at a desirable angle S, extending inwardly toward the saw axis from a tangent 41 to the blade periphery. By way of example, such angle S can be 30°. The angle S can vary, as between a zero angle with the nozzle axis tangent to the blade periphery, to one in which the nozzle axis is radial of the blade axis. The preferred angle of 30° is found to be effective.

The abrasive powder 24 employed may be of any suitable type, such as $Al_2O_3$, $SiO_2$, the preferred size of the powder being between about 20 and 200 mesh. The abrasive powder is preferably of an angular type, but other powders and other shapes are also operable. It has been found that the fluid source for impacting the abrasive material against the matrix of the saw blade can be any conventional compressed air or gas supply, the pressures ranging from about 50 to 200 p.s.i. and volumes ranging from about 12 to 150 cubic feet per minute. Liquids can also be used as the fluid for carrying the abrasive 24 from the tank 28 through the conduit 29 and for discharging the abrasive against the saw blade 10.

The jet stream emanating from the nozzle 26 is preferably smaller in diameter than the blade kerf width, although this is not indispensible to the effective operation of the apparatus. A preferred nozzle or orifice opening has a diameter about 90 percent of the blade kerf width. It is to be understood, however, that the nozzle passage configuration can be a slot that is rectangular, oval, or any other desired shape, to effect maximum control of the blade contour.

The sharpening action may also be controlled by a person operating the equipment, who can manually operate the air valve 31 and the sand valve 33 to effect their opening and closing at the desired times, thereby controlling both the length of time of blasting and the interval of time between blasting of the abrasive material 24 against the saw periphery 25.

Another method of controlling the blasting time period and the interval of time between blasting is illustrated in FIG. 1. As shown therein, an ammeter 50 is in a circuit with the electric motor 11 and a control box 35 (replacing the timer 35) that is connected to the solenoids of the abrasive powder valve 33 and the air valve 31. The control box 35 is fed a signal from the ammeter 50 when the amperage level of the sawing machine motor 11 reaches a predetermined maximum value, the control box completing the circuits to the solenoid valves 33, 31 and effecting their opening, causing the air driven jet of abrasive powder 24 to discharge against the saw blade and effect its sharpening. When the desired degree of sharpening is reached, which, for example, may be in about 10 seconds, the amperage level of the electric motor 11 will decrease, whereupon the control box 35 receives a signal from the ammeter 50 opening the circuit to the air valve 31 and abrasive powder valve 33, which will then close. It is evident that the dulling of the saw blade 10 automatically effects its resharpening, and when the saw blade has reached a desired sharpened condition, resharpening is automatically discontinued.

In the event that the prime mover 11 is an internal combustion engine, manual opening and closing of the valves 33, 31 can be effected by the operator reading a suitable vacuum gauge on the engine. Automatic opening and closing of such valves can also be effected by the vacuum closing and opening the electric circuit to the solenoid operated valves 31, 33.

Although specific reference has been made to the feeding of abrasive powders, such as sand, to the nozzle 26 and blasting such powders against the periphery 25 of the saw blade, the abrading away of the matrix 22 can be accomplished by jetting acids through the nozzle 26 and against the matrix, replacing the nozzle 26 with an appropriate electrode to produce an arc discharging against the matrix, or by jetting very high pressure streams of water against the matrix, the pressure, for example, being of the order of 15,000 p.s.i.

As illustrated in FIG. 3, a plurality of nozzles 26, 26a can be employed to further increase the sharpening and contouring control over the saw blade. As disclosed, a nozzle 26 is provided for jetting abrasive material against the periphery 25 of the saw blade, while nozzles 26a are disposed on opposite sides of the saw blade rim 18, for the purpose of causing the abrasive to impinge on the sides 25a of the blade rim. Thus, the periphery and the sides of the blade rim have some matrix material 22 abraded away for the purpose of exposing diamonds 23 and restoring the sharpness of the blade, insuring its continuous effective cutting action in the work W.

By insuring the appropriate sharpness of the saw blade while it is performing its cutting action, the sawing rate of the saw blade is increased, as well as the efficiency of the entire system. In addition, no down time or slowing down of the cutting operation of the saw blade is required. Because of its continuous sharpness, the blade runs in a clean and cool manner, its life being substantially enhanced. The sharp and properly contoured blade has less tendency to off saw or cause spalls or fins in the work being cut, the cut surface being smooth. Since assurance is had that a sharp saw blade is always present for cutting the work, lower horsepower equipment, lighter weight machines, smaller fixtures, and the like, need be provided, thereby effecting substantial economies.

We claim:

1. In apparatus including a circular saw having a cutting portion and rotating means for rotating the saw while the cutting portion is fed into material to produce a cut therein, the combination therewith of sharpening means adapted to be applied to said cutting portion to sharpen the same while the cut is being produced in the material, and control means for effecting periodic application of said sharpening means to said cutting portion while said saw is rotating; said sharpening means including a nozzle, a source of abrasive powder, a conduit through which the powder is conveyed from said source to said nozzle, and fluid means under pressure for conveying the powder through said conduit and for jetting the powder from said nozzle against said cutting portion.

2. In apparatus as defined in claim 1; said control means including first valve means for controlling flow of the powder from the source to said conduit, second valve means for controlling flow of said fluid means to said conduit, and means for effecting substantially simultaneous and periodic opening and closing of said first and second valve means.

3. In apparatus as defined in claim 1; said control means including first valve means for controlling flow of the powder from the source to said conduit, second valve means for controlling flow of said fluid means to said conduit, and means including a timer for effecting substantially simultaneous and periodic opening and closing of said first and second valve means.

4. In apparatus as defined in claim 1; said control means including first valve means for controlling flow of the powder from the source to said conduit, second valve means for controlling flow of said fluid means to said conduit, and means responsive to the power requirements of said rotating means while the cut is being produced for effecting substantially simultaneous and periodic opening and closing of said first and second valve means.

5. In apparatus including a circular saw having a cutting portion and rotating means for rotating the saw while the cutting portion is fed into material to produce a cut therein, the combination therewith of sharpening means adapted to be applied to said cutting portion to sharpen the same while the cut is being produced in the material, and control means for effecting periodic application of said sharpening means to said cutting portion while said saw is rotating; said control means including means responsive to the power requirements of said rotating means for intermittently applying said sharpening means to said cutting portion.

6. In apparatus including a circular saw having a rim comprising a matrix in which diamond cutting elements are embedded and rotating means for rotating the saw while the rim is fed into material to produce a cut therein, the combination therewith of sharpening means adapted to be applied to said rim to abrade the matrix and expose diamond cutting elements while the cut is being produced, and control means for effecting periodic application of said sharpening means to said rim while said saw is rotating; said sharpening means including a nozzle, a source of abrasive powder, a conduit through which the powder is conveyed from said source to said nozzle, and fluid means under pressure for conveying the powder through said conduit for jetting the powder from said nozzle against said rim.

7. In apparatus as defined in claim 6; said control means including first valve means for controlling flow of the powder from the source to said conduit, second valve means for controlling flow of said fluid means to said conduit, and means for effecting periodic and substantially simultaneous opening and closing of said first and second valve means.

8. In apparatus including a circular saw having a rim comprising a matrix in which diamond cutting elements are embedded and rotating means for rotating the saw while the rim is fed into material to produce a cut therein, the combination therewith of sharpening means adapted to be applied to said rim to abrade the matrix and expose diamond cutting elements while the cut is being produced, and control means for effecting periodic application of said sharpening means to said rim while said saw is rotating; said sharpening means including a source of abrasive powder, nozzles for directing the powder against the periphery and opposed sides of said rim, conduit means through which the powder is conveyed from said source to said nozzles, and fluid means under pressure for conveying the powder through said conduit means and for jetting the powder from said nozzles against said periphery and opposite sides of said rim.

9. In apparatus as defined in claim 8; said control means including first valve means for controlling flow of the powder from the source to said conduit means, said valve means for controlling flow of said fluid means to said conduit means, and means for effecting periodic and substantially simultaneous opening and closing of said first and second valve means.

10. In apparatus as defined in claim 6; said control means including first valve means for controlling flow of the powder from the source to said conduit, second valve means for controlling flow of said fluid means to said conduit, and means including a timer for effecting periodic and substantially simultaneous opening and closing of said first and second valve means.

11. In apparatus as defined in claim 6; said control means including first valve means for controlling flow of the powder from the source to said conduit, second valve means for controlling flow of said fluid means to said conduit, and means responsive to the power requirements of said rotating means while the cut is being produced for effecting periodic and substantially simultaneous opening and closing of said first and second valve means.

12. In apparatus including a circular saw having a rim comprising a matrix in which diamond cutting elements are embedded and rotating means for rotating the saw while the rim is fed into material to produce a cut therein, the combination therewith of sharpening means adapted to be applied to said rim to abrade the matrix and expose diamond cutting elements while the cut is being produced, and control means for effecting periodic application of said sharpening means to said rim while said saw is rotating; said control means including means responsive to the power requirements of said rotating means for intermittently applying said sharpening means to said rim.

13. In a method of sharpening a circular saw having a cutting portion, the saw being rotated by a prime mover, comprising conveying an abrasive powder from a source through a conduit to the cutting portion while the cutting portion is performing its cutting action in material, conducting a fluid under pressure to said conduit to jet the abrasive powder therein against the cutting portion, and automatically and alternately continuing and discontinuing the application of the fluid under pressure to said conduit while the cutting action continues to alternately effect sharpening of the cutting portion by the abrasive powder and non-sharpening of the cutting portion.

14. In a method as defined in claim 13; the automatic and alternate continuing and discontinuing of said application of fluid under pressure being controlled in response to the power requirements of the prime mover.

* * * * *